(12) United States Patent
Wang et al.

(10) Patent No.: US 9,195,086 B2
(45) Date of Patent: Nov. 24, 2015

(54) FRONT AND REAR COMPOUND LIQUID CRYSTAL DISPLAY COMPRISING A REFLECTION BOARD HAVING A BOTTOM BOARD AND A PAIR OF WING BOARDS AT TWO SIDES

(71) Applicant: COREMATE TECHNICAL CO., LTD., Taoyuan County (TW)

(72) Inventors: Robert Wang, Taoyuan County (TW); Shih-Ming Yeh, Taoyuan County (TW)

(73) Assignee: COREMATE TECHNICAL CO., LTD., Taoyuan County (TW)

( * ) Notice: Subject to any disclaimer, the term of this patent is extended or adjusted under 35 U.S.C. 154(b) by 92 days.

(21) Appl. No.: 14/150,597

(22) Filed: Jan. 8, 2014

(65) Prior Publication Data

US 2015/0192821 A1 Jul. 9, 2015

(51) Int. Cl.
*G02F 1/1335* (2006.01)
*G02F 1/1333* (2006.01)

(52) U.S. Cl.
CPC ........ *G02F 1/133308* (2013.01); *G02F 1/1336* (2013.01)

(58) Field of Classification Search
CPC ............ G02F 1/133308; G02F 1/1336; G02F 2001/133342
USPC .......................................................... 349/63
See application file for complete search history.

(56) References Cited

U.S. PATENT DOCUMENTS

| 6,819,380 B2* | 11/2004 | Wen ................... G02F 1/133555 349/114 |
| 2011/0032223 A1* | 2/2011 | Okamoto ................ G02F 1/167 345/204 |
| 2012/0169967 A1* | 7/2012 | Han et al. ......................... 349/62 |

* cited by examiner

*Primary Examiner* — Paul Lee
(74) *Attorney, Agent, or Firm* — Ming Chow; Sinorica, LLC

(57) ABSTRACT

A front and rear compound liquid crystal display includes a liquid crystal film which is selectively disposed in front of or behind an image display unit. The liquid crystal film can be controlled in a transparent, translucent or opaque state. In case the liquid crystal film is disposed in front of the image display unit, when the liquid crystal film is in the opaque state, it can function as a white board; when the liquid crystal film is in the transparent state, it can display the content of the image display unit. In case the liquid crystal film is disposed behind the image display unit, when the liquid crystal film is in the transparent state, it has visual penetration; when the liquid crystal film is in the opaque state, it can function as a reflection plate for the image of the image display unit to be displayed clearly.

7 Claims, 5 Drawing Sheets

FRONT AND REAR COMPOUND LIQUID CRYSTAL DISPLAY COMPRISING A REFLECTION BOARD HAVING A BOTTOM BOARD AND A PAIR OF WING BOARDS AT TWO SIDES

BACKGROUND OF THE INVENTION

1. Field of the Invention

The present invention relates to a display, and more particularly to a front and rear compound liquid crystal display.

2. Description of the Prior Art

A conventional liquid crystal display to display image is composed of an image display unit, a backlight board and a guide light source. For the image to be displayed clearly and to have a vivid contrast, the backlight board doesn't have visual penetration. When the guide light source is off, the backlight board is dark. When the guide light source is on, the backlight board is white. The guide light source shoots its light to the front of the liquid crystal display.

However, when the conventional liquid crystal display is not used, it usually stands at a very conspicuous position. Thus, the entire environment is slightly awkward, and it may hinder the vision. The conventional liquid crystal display cannot provide other functions and takes up a lot of space when it is not used. Accordingly, the inventor of the present invention has devoted himself based on his many years of practical experiences to solve this problem.

SUMMARY OF THE INVENTION

The primary object of the present invention is to provide a front and rear compound liquid crystal display. A liquid crystal film is selectively disposed in front of or behind an image display unit. By using the liquid crystal film to be in a transparent or opaque state, the liquid crystal film can function as a backlight board. It can be in a transparent state, not blocking the vision, when it doesn't display the image. Alternatively, the liquid crystal film can function as a white board when it doesn't display the image to be in a milky nebulized opaque state. The front and rear compound liquid crystal display provides multiple functions when it doesn't display image.

In order to achieve the aforesaid object, the front and rear compound liquid crystal display of the present invention comprises a liquid crystal film. The liquid crystal film can control its transparency by means of voltage. The liquid crystal film is controlled by electrifying to be high transparent state or opaque. One side of the liquid crystal film is provided with an image display unit. The image display unit is adapted to display image. Another side of the liquid crystal film is provided with a panel member. A frame is provided at the circumferential sides of the liquid crystal film, the image display unit and the panel member to connect and fix the liquid crystal film, the image display unit and the panel member.

The front and rear compound liquid crystal display of the present invention provides the liquid crystal film which can be controlled in a transparent or opaque state. The liquid crystal film is selectively disposed in front of or behind the image display unit. In case the liquid crystal film is disposed behind the image display unit, the liquid crystal film functions as a backlight board when the image display unit displays the image and is in the opaque state, alternatively, the liquid crystal film has visual penetration, not blocking the vision, when the image display unit doesn't display the image and is in the transparent state. In case the liquid crystal film is disposed in front of the image display unit, the liquid crystal film will function as a white board when the image display unit doesn't display the image to be in a milky nebulized opaque state. The front and rear compound liquid crystal display provides multiple functions when it doesn't display image.

DETAILED DESCRIPTION OF THE PREFERRED EMBODIMENTS

Embodiments of the present invention will now be described, by way of example only, with reference to the accompanying drawings.

Figure 1:
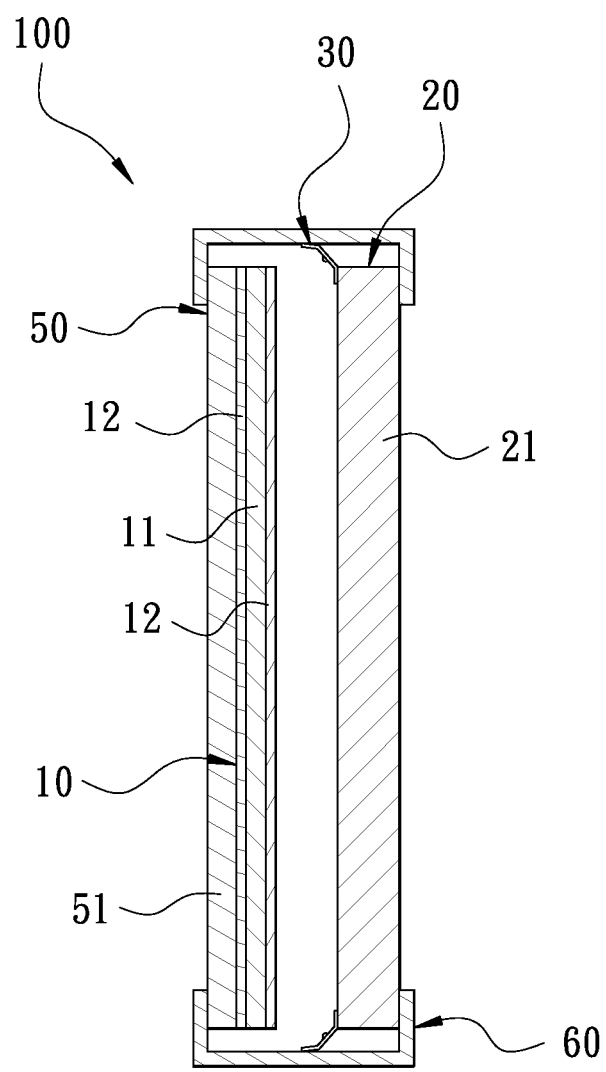
FIG. 1 is a sectional view according to a first embodiment of the present invention.
Figure 2:
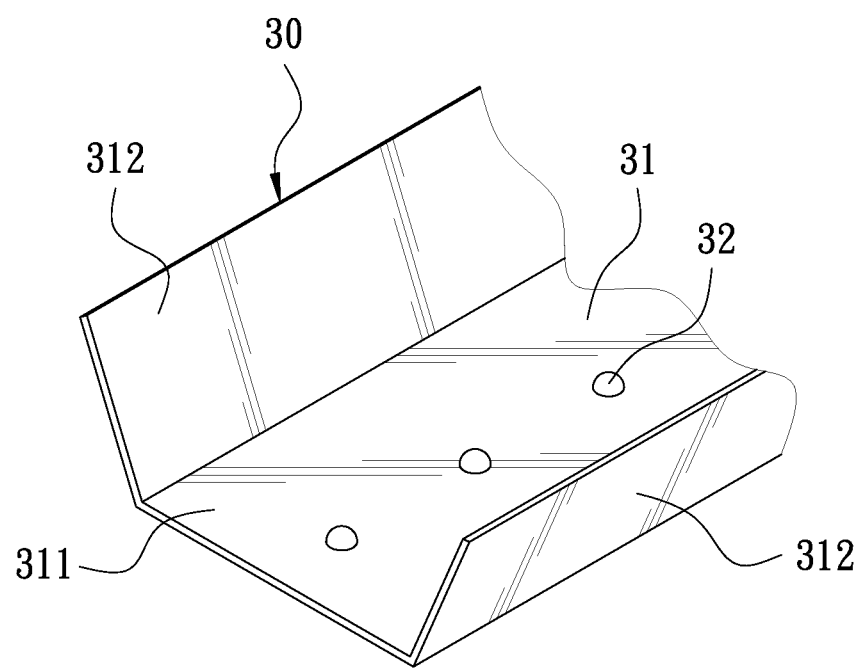
FIG. 2 is a schematic view showing the guide light source according to the first embodiment of the present invention.

FIG. 1 is a sectional view according to a first embodiment of the present invention. FIG. 2 is a schematic view showing the guide light source according to the first embodiment of the present invention. The present invention discloses a front and rear compound liquid crystal display 100. The front and rear compound liquid crystal display 100 comprises a liquid crystal film 10, an image display unit 20, a guide light source 30, a panel member 50, and a frame 60.

The liquid crystal film 10 comprises a liquid crystal layer 11 and two transparent conductive films 12. The two transparent conductive films 12 are respectively disposed at two opposing sides of the liquid crystal layer 11. The liquid crystal layer 11 can control its transparency by means of voltage. The liquid crystal layer 11 is controlled by electrifying to be a high transparent state or an opaque state. In the present invention, when the liquid crystal film 10 is not electrified, the liquid crystal molecules of the liquid crystal layer 11 are arranged disorderly and randomly for the light passing through the liquid crystal film 10 to be refracted and scattered, such that the appearance of the liquid crystal film 10 is in a milky even nebulized opaque state. When the transparent conductive films 12 of the liquid crystal film 10 are electrified, the liquid crystal molecules of the liquid crystal layer 11 are arranged in a single direction due to the function of the electric field for the parallel light to pass through the liquid crystal film 10 smoothly, such that the appearance of the liquid crystal film 10 is in a high transparent state. In this way, the liquid crystal film 10 is controlled by electrifying to be a high transparent state or an opaque state. This is only one embodiment of the present invention, but not limited to. The present invention can elect a liquid crystal film 10 for the parallel light to pass through the liquid crystal film 10 smoothly when the liquid crystal film 10 is not electrified, such that the appearance of the liquid crystal film 10 is in a high transparent state. When the liquid crystal film 10 is electrified, the light passing through the liquid crystal film 10 will be refracted and scattered so that the appearance of the liquid crystal film 10 is in a milky even nebulized opaque state.

The image display unit 20 is disposed at one side of the liquid crystal film 10. The image display unit 20 is adapted to display image. In the first embodiment of the present invention, the image display unit 20 is a liquid crystal display (LCD) 21. The liquid crystal display 21 is a glass liquid crystal display and has visual penetration. The liquid crystal display 21 is disposed at the front side of the liquid crystal film 10 in a parallel manner.

The guide light source 30 is disposed at the circumferential side of the image display unit 20. The shooting direction of the guide light source 30 is toward the liquid crystal film 10. In the first embodiment of the present invention, the guide light source 30 is disposed around the circumferential edge of the image display unit 20 along the radial direction of the image display unit 20. As shown in FIG. 2, the guide light source 30 comprises a reflection board 31 and a plurality of LED (light emitting diode) light sources 32. The reflection board 31 has a strip shape and is disposed along the circumferential edge of the image display unit 20. The reflection board 31 has a bottom board 311 in a long axis direction thereof. The LED light sources 32 are spaced and fixed on the bottom board 311 in the long axis direction. The reflection board 31 further has a pair of wing boards 312 at two sides of the bottom board 311 extending in the long axis direction. One of the pair of wing boards 312 is fixed on the image display unit 20, such that the reflection board 31 is obliquely disposed at the circumferential edge of the image display unit 20 and the LED light sources 32 on the bottom board 311 face the liquid crystal film 10 to shoot light evenly on the liquid crystal film 10 so as to enhance the color of the image from the image display unit 20.

The panel member 50 is pervious to light. The panel member 50 is disposed at another side of the liquid crystal film 10, namely, at the side opposite the image display unit 20. In the first embodiment of the present invention, the panel member 50 is a transparent plastic panel 51. The panel member 50 is parallelly disposed at the rear side of the liquid crystal film 10.

The frame 60 is disposed at the circumferential sides of the liquid crystal film 10, the image display unit 20 and the panel member 50 to connect and fix the liquid crystal film 10, the image display unit 20 and the panel member 50. Referring to FIG. 2, the other of the pair of wing boards 312, relative to the wing board fixed on the image display unit 20, is fixed on the frame 60. That is to say, one of the pair of wing boards 312 extending along the two sides of the bottom board 311 of the reflection board 31 is fixed on the frame 60, and the other of the pair of wing boards 312 is fixed on the image display unit 20.

Figure 3:
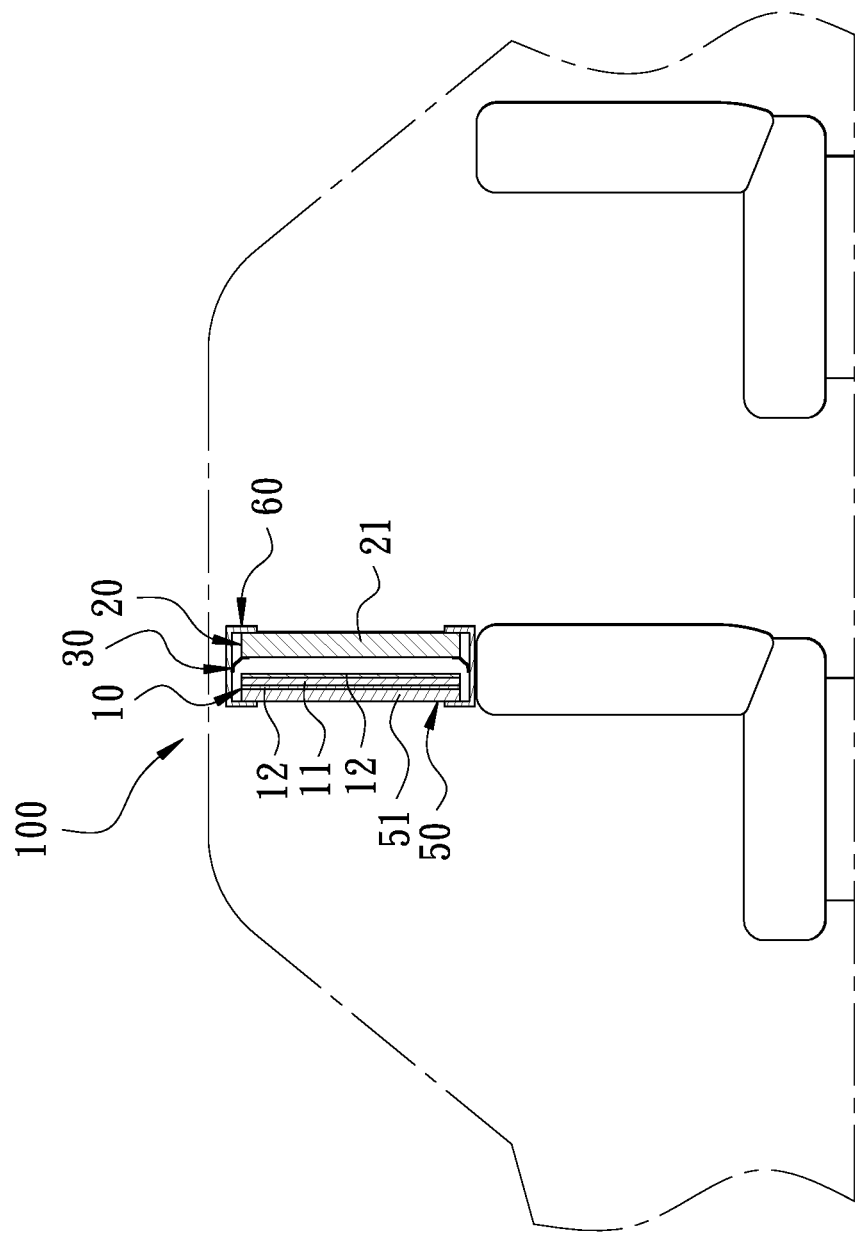
FIG. 3 is a schematic view showing the first embodiment of the present invention when in use.

FIG. 3 is a schematic view showing the first embodiment of the present invention when in use. In the first embodiment of the present invention, the front and rear compound liquid crystal display 100 is disposed between the passenger seat and the driver seat of a taxi. This is just one embodiment, but not limited to. The front and rear compound liquid crystal display 100 can be used to display image. The liquid crystal film 10 is in an outage state and the transparent conductive films 12 of the liquid crystal film 10 are not electrified, so that the liquid crystal molecules of the liquid crystal layer 11 are arranged randomly and the liquid crystal film 10 is in a milky even nebulized opaque state as the backlight board of the image display unit 20. Thus, the image display unit 20 can display the image clearly.

When the front and rear compound liquid crystal display 100 doesn't display the image, the transparent conductive films 12 of the liquid crystal film 10 are electrified for the liquid crystal film 10 to be in an electrified state. The liquid crystal molecules of the liquid crystal layer 11 are arranged in a single direction due to the function of the electric field, such that the liquid crystal film 10 is in a high transparent state. The front and rear compound liquid crystal display 100 has visual penetration, not blocking the vision of the passenger and the driver.

Accordingly, the front and rear compound liquid crystal display 100 can use the electrochromic technology to display the image to a transparent partition or window directly, or to provide an advertisement, to televise, or to display instant information. The front and rear compound liquid crystal display 100 has the properties of penetration and reflection to provide an innovated display.

Figure 4:
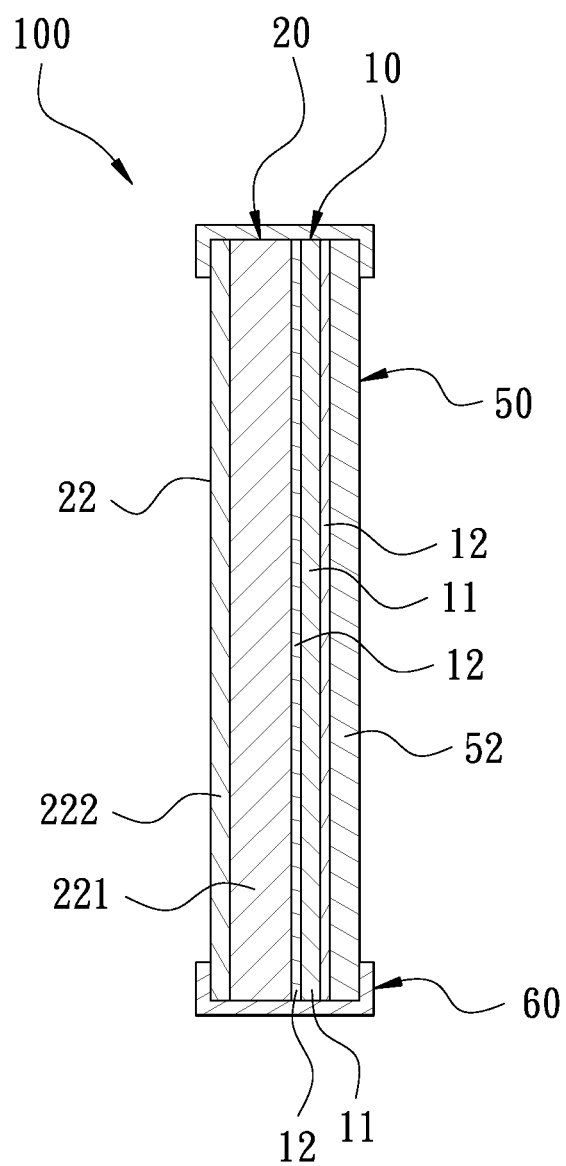
FIG. 4 is a sectional view according to a second embodiment of the present invention.

FIG. 4 is a sectional view according to a second embodiment of the present invention. The second embodiment is substantially similar to the first embodiment with the exceptions described hereinafter. The image display unit 20 is parallelly disposed at the rear side of the liquid crystal film 10. The panel member 50 is parallelly disposed at the front side of the liquid crystal film 10. The image display unit 20 is a liquid crystal display module (LCM) 22. The liquid crystal display module 22 comprises a liquid crystal display 221 and a back light source 222. In the second embodiment of the present invention, there is no need for the guide light source. The panel member 50 is a capacitance inductive panel 52. The capacitance inductive panel 52 has a touch display function. Wherein, the touch function of the capacitance inductive panel 52 is a capacitance touch to cooperate with a capacitance touch system for executing touch. This is just one embodiment, but not limited to. The capacitance inductive panel 52 can select an optical inductive device to cooperate with an infrared LED for sensing.

It is noted that the liquid crystal display module 22 of the second embodiment of the present invention can be replaced with a traditional liquid crystal display.

Figure 5:
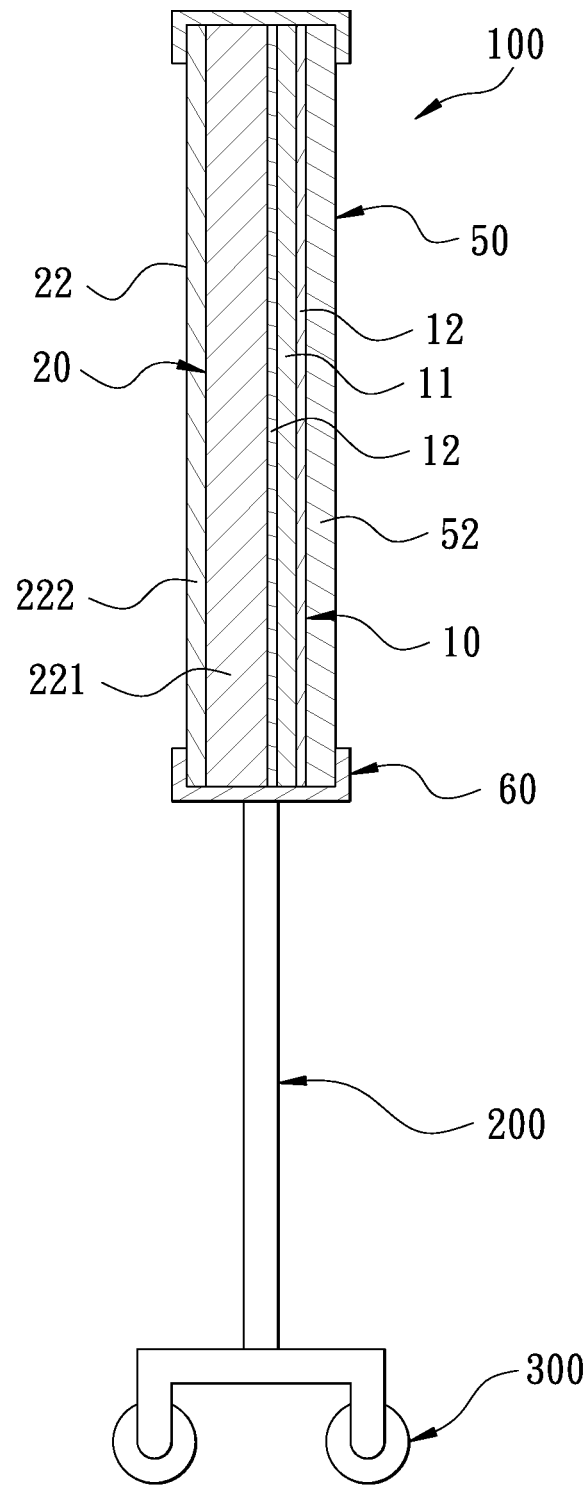
FIG. 5 is a schematic view showing the second embodiment of the present invention when in use.

FIG. 5 is a schematic view showing the second embodiment of the present invention when in use. In the second embodiment of the present invention, the front and rear compound liquid crystal display 100 uses the liquid crystal display module 22 composed of the liquid crystal display 221 and the back light source 222 to display the image clearly. When the front and rear compound liquid crystal display 100 needs to display the image, the transparent conductive films 12 of the liquid crystal film 10 are electrified for the liquid crystal film 10 to be in an electrified state. The liquid crystal molecules of the liquid crystal layer 11 are arranged in a single direction due to the function of the electric field, such that the liquid crystal film 10 is in a high transparent state to have visual penetration, not blocking the vision. The front and rear compound liquid crystal display 100 has visual penetration, not blocking the vision of the passenger and the driver. The liquid crystal display module 22 can display the image clearly.

When the front and rear compound liquid crystal display 100 doesn't display the image, the liquid crystal film 10 is in an outage state and the transparent conductive films 12 of the liquid crystal film 10 are not electrified, so that the liquid crystal molecules of the liquid crystal layer 11 are arranged randomly and the liquid crystal film 10 is in a milky even nebulized opaque state. The front and rear compound liquid crystal display 100 can function as a white board, and the capacitance inductive board 52 is used to support the touch display function.

Furthermore, the front and rear compound liquid crystal display 100 of the second embodiment of the present invention is disposed on a support 200. The bottom of the support 200 is provided with a plurality of wheels 300 so that the front and rear compound liquid crystal display 100 can be moved conveniently for use.

It is noted that the front and rear compound liquid crystal display 100 has a simple structure and can be manufactured at a very low cost. If the front and rear compound liquid crystal display 100 is applied to a smart display device, it is advantageous to the price. Besides, the optical performance has its advantage according to its unique display characteristic and cooperates with liquid crystal film 10 to be used for different applications of reflection and penetration.

The features and expected effects of the present invention are described as follows:

The front and rear compound liquid crystal display 100 of the present invention uses the liquid crystal film 10 as the backlight board for the front and rear compound liquid crystal display 100 to have visual penetration. When it doesn't display the image, it is in a transparent state, not blocking the vision. By using the liquid crystal film 10, it can function as a white board when it doesn't display the image to be in a milky nebulized opaque state.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A front and rear compound liquid crystal display, comprising:
    a liquid crystal film, the liquid crystal film being able to control its transparency;
    an image display unit disposed at one side of the liquid crystal film, the image display unit being adapted to display image;
    a panel member pervious to light, the panel member being disposed at another side of the liquid crystal film;
    a frame disposed at circumferential sides of the liquid crystal film, the image display unit and the panel member to connect and fix the liquid crystal film, the image display unit and the panel member;
    a guide light source, the guide light source being disposed at the circumferential side of the image display unit, the guide light source having a shooting direction toward the liquid crystal film;
    the image display unit is disposed at a front side of the liquid crystal film and the panel member is disposed at a rear side of the liquid crystal film; and
    the guide light source comprises a reflection board and a plurality of LED (light emitting diode) light sources, the reflection board having a strip shape, the reflection board having a bottom board in a long axis direction thereof, the LED light sources being spaced and fixed on the bottom board in the long axis direction, the reflection board further having a pair of wing boards at two sides of the bottom board extending in the long axis direction, one of the pair of the wing boards being fixed on the frame, the other of the pair of wing boards being fixed on the image display unit.

2. The front and rear compound liquid crystal display as claimed in claim 1, wherein the image display unit is a liquid crystal display (LCD).

3. The front and rear compound liquid crystal display as claimed in claim 1, wherein the panel member is a transparent plastic panel.

4. The front and rear compound liquid crystal display as claimed in claim 1, wherein the image display unit is disposed at a rear side of the liquid crystal film and the panel member is disposed at a front side of the liquid crystal film.

5. The front and rear compound liquid crystal display as claimed in claim 4, wherein the image display unit is a liquid crystal display module (LCM).

6. The front and rear compound liquid crystal display as claimed in claim 4, wherein the panel member is a capacitance inductive panel.

7. The front and rear compound liquid crystal display as claimed in claim 4, wherein a support is provided under the frame, a bottom of the support being provided with a plurality of wheels for movement.

\* \* \* \* \*